US012638383B2

(12) United States Patent
Jones et al.

(10) Patent No.: US 12,638,383 B2
(45) Date of Patent: May 26, 2026

(54) MEASUREMENT OF GASEOUS/VOLATILE HYDROCARBON CONCENTRATIONS

(71) Applicant: Schlumberger Technology Corporation, Sugar Land, TX (US)

(72) Inventors: Timothy Gareth John Jones, Cottenham (GB); Debora Campos de Faria, Cambridge (GB); Jill Geddes, Cambridge (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 168 days.

(21) Appl. No.: 18/813,451

(22) Filed: Aug. 23, 2024

(65) Prior Publication Data

US 2026/0056121 A1      Feb. 26, 2026

(51) Int. Cl.
*G01N 21/00*        (2006.01)
*G01N 21/3504*      (2014.01)

(52) U.S. Cl.
CPC ................................. *G01N 21/3504* (2013.01)

(58) Field of Classification Search
CPC ... G01N 2021/3137; G01N 2021/3545; G01N 21/0303; G01N 21/3504; G01N 21/61; G01N 33/0004; G01N 33/0047
See application file for complete search history.

(56) References Cited

U.S. PATENT DOCUMENTS

| | | | |
|---|---|---|---|
| 5,167,149 | A | 12/1992 | Mullins |
| 5,220,402 | A | 6/1993 | Harvey |
| 5,648,603 | A | 7/1997 | Hanson |
| 6,037,592 | A | 3/2000 | Sunshine |
| 6,843,102 | B1 | 1/2005 | Shulga |
| 6,974,705 | B1 | 12/2005 | Brumboiu |
| 6,995,360 | B2 | 2/2006 | Jones |
| 7,434,446 | B2 | 10/2008 | Johnson |
| 7,658,094 | B2 | 2/2010 | Brumboiu |
| 8,381,572 | B2 | 2/2013 | Esser |
| 8,899,348 | B2 | 12/2014 | Henderson |
| 8,904,859 | B2 | 12/2014 | Lawrence |
| 10,018,606 | B2 | 7/2018 | Fietzek |
| 10,101,266 | B2 | 10/2018 | Viitanen |
| 10,241,095 | B2 | 3/2019 | Coates |
| 10,251,095 | B2 | 4/2019 | Shi |

(Continued)

FOREIGN PATENT DOCUMENTS

| | | |
|---|---|---|
| CA | 2456276 C | 4/2014 |
| CN | 104122223 A | 10/2014 |

(Continued)

OTHER PUBLICATIONS

Becker, M. et al., "Using cavity ringdown spectroscopy for continuous monitoring of $\delta 13C(CO2)$ and $fCO2$ in the surface ocean," Limnology and Oceanography: Methods, 2012, vol. 10, Issue 10, pp. 752-766.

(Continued)

*Primary Examiner* — Dani Fox
(74) *Attorney, Agent, or Firm* — Jeffrey D. Frantz

(57)        ABSTRACT

Concentrations of individual hydrocarbons in a gas mixture are determined by measuring absorbance of mid-infrared radiation at specific wavelengths. Computation enables determination of concentrations of individual hydrocarbons despite overlaps of absorption bands.

11 Claims, 5 Drawing Sheets

(56) References Cited

U.S. PATENT DOCUMENTS

| 10,451,784 | B2 | 10/2019 | Jones | |
| 10,663,441 | B2 | 5/2020 | Coates | |
| 10,837,948 | B2 | 11/2020 | Fietzek | |
| 2006/0093523 | A1 | 5/2006 | Norman | |
| 2010/0264315 | A1* | 10/2010 | Okada | G01N 21/3504 |
| | | | | 250/343 |
| 2012/0330568 | A1 | 12/2012 | Izawa | |
| 2018/0095028 | A1 | 4/2018 | Jourdainne | |
| 2020/0284774 | A1 | 9/2020 | Coates | |
| 2022/0205906 | A1 | 6/2022 | Martin | |
| 2023/0125832 | A1 | 4/2023 | Lancuba | |
| 2023/0221246 | A1 | 7/2023 | Kapit | |
| 2024/0295492 | A1 | 9/2024 | Pein | |
| 2024/0353323 | A1 | 10/2024 | Lutzi | |

FOREIGN PATENT DOCUMENTS

| WO | 2014008915 A1 | 1/2014 |
| WO | 2023009605 A1 | 2/2023 |
| WO | 2023200655 A1 | 10/2023 |

OTHER PUBLICATIONS

Brumboiu, A. O. et al., "Application of Semipermeable Membrane Technology in the Measurement of Hydrocarbon Gases in Drilling Fluids", SPE-62525-MS, paper presented at the SPE/AAPG Western Regional Meeting, Long Beach, California, Jun. 2000, 12 pages.

Buijs, H. "Incandescent Sources for Mid- and Far-Infrared Spectrometry" in Handbook of Vibrational Spectroscopy, vol. 1: Theory and Instrumentation (P. Griffiths and J.M. Chalmers, editors), pp. 337-340.

Clarke, J. S. et al., "Developments in marine pCO2 measurement technology; towards sustained in situ observations," Trends in Analytical Chemistry, 2017, 88, pp. 53-61.

Degrandpre, M. D. et al., "Calibration-Free Optical Chemical Sensors," Analytical Chemistry, 1999, 71, pp. 1152-1159.

Dinh, T.-V et al., "A review on non-dispersive infrared gas sensors: Improvement of sensor detection limit and interference correction," Sensors and Actuators B: Chemical, 2016, 231, pp. 529-538.

Fiedler, B. et al., "In Situ CO2 and O2 Measurements on a Profiling Float," Journal of Atmospheric and Oceanic Technology, 2013, vol. 30, Issue 1, pp. 112-126.

Fietzek, P. et al., "In situ Quality Assessment of a Novel Underwater pCO2 Sensor Based on Membrane Equilibration and NDIR Spectrometry", Journal of Atmospheric and Oceanic Technology, 2014, vol. 31, Issue 1, pp. 181-196.

Friedrichs, G. et al., "Toward continuous monitoring of seawater 13CO2/12CO2 isotope ratio and pCO2: Performance of cavity ringdown spectroscopy and gas matrix effects," Limnology and Oceanography: Methods, 2010, vol. 8, Issue 10, pp. 539-551, 2010.

Guo, Y. et al., "Compact optical multipass matrix system design based on slicer mirrors," Applied Optics, 2018, vol. 57, Issue 5, pp. 1174-1181.

Jiang, Z.-P. et al., "Application and assessment of a membrane-based pCO2 sensor under field and laboratory conditions", Limnology and Oceanography: Methods, 2014, vol. 12, Issue 4, pp. 264-280.

Popa, D. et al., "Towards Integrated Mid-Infrared Gas Sensors," Sensors, 2019, vol. 19, Issue 9, 15 pages.

Pribylov, A. A. et al., Methane solubility in liquid hydrocarbons at high pressure, Russian Chemical Bulletin, 2015, pp. 841-845.

Rokotyan, N. et al., "Bottlenecks in the remote sensing of the 13CO2/12CO2 isotopic ratio from GOSAT measurements," presented at the 23rd International Symposium on Atmospheric and Ocean Optics: Atmospheric Physics, 2017, 9 pages.

Schar, D. et al., "Performance Demonstration Statment—Sunburst Sensors SAMI-CO2", in UMCES Technical Report Series, Alliance for Coastal Technologies, 2009, 25 pages.

Schar, D. et al., "Performance Demonstration Statment Contros HydroC™/CO2," in "UMCES Technical Report Series," Alliance for Coastal Technologies, 2009.

Sennaroglu, A. et al., Design criteria for Herriott-type multi-pass cavities for ultrashort pulse lasers, Optics Express, 2003, vol. 11, Issue 9, pp. 1106-1113.

Severinghaus, J. W. et al., "Electrodes for Blood pO2, and pCO2, Determination," Journal of Applied Physiology, 1958, vol. 13, Issue 3, pp. 515-520.

Shoemaker, L. G., J. C. Turnbull, P. P. Tans, J. B. Miller, B. H. Vaughn, S. E. Michel, and S. J. Lehman (2010), Fingerprints of Emissions and the Carbon Cycle: Stable and Radiocarbon Isotopes of Carbon Dioxide, NOAA/GML, http://gml.noaa.gov/outreach/isotopes/, "The Data: The Story Told from CO2 Samples", 3 pages.

Takahashi, T. et al., "Climatological distributions of pH, pCO2, total CO2, alkalinity, and CaCO3 saturation in the global surface ocean, and temporal changes at selected locations", Marine Chemistry, 2014, 164, pp. 95-125.

Tuzson, B. et al., "Compact multipass optical cell for laser spectroscopy", Optics Letters, 2103, vol. 38, Issue 3, pp. 257-259.

* cited by examiner

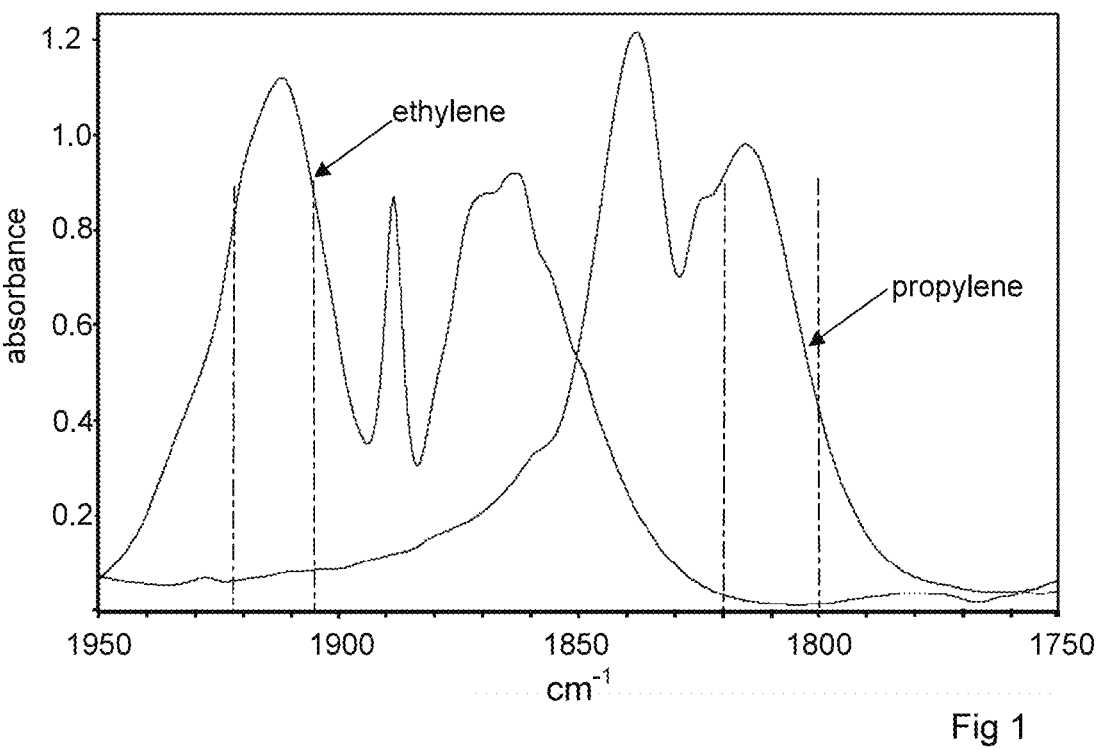
Fig 1
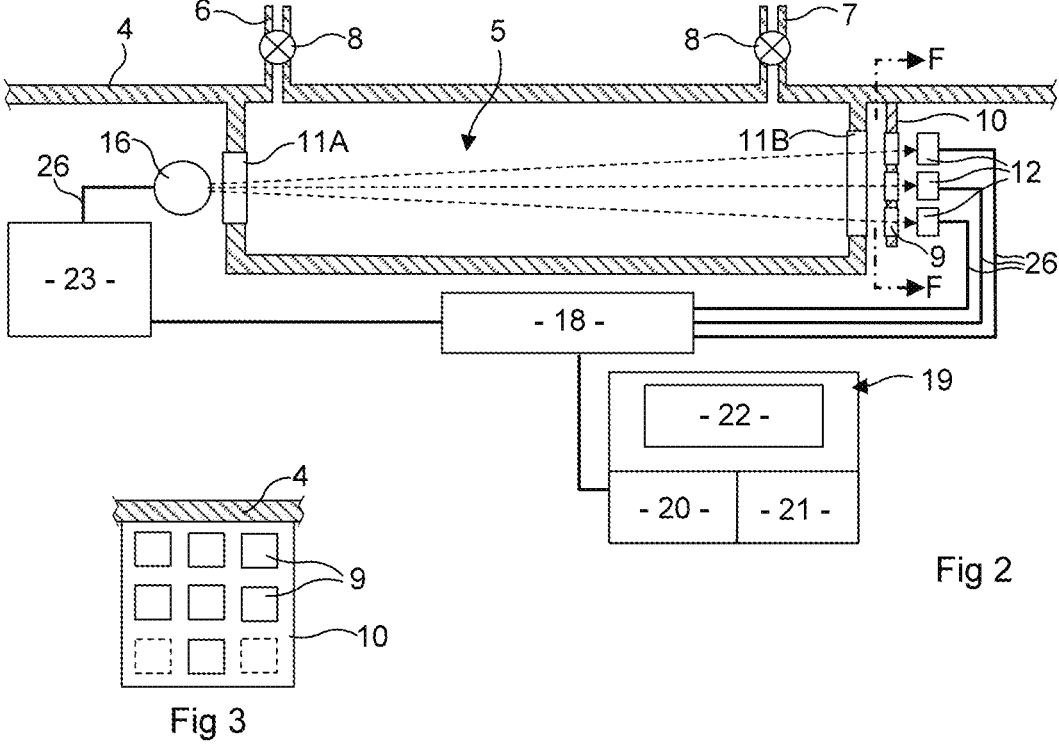
Fig 2
Fig 3

MEASUREMENT OF GASEOUS/VOLATILE HYDROCARBON CONCENTRATIONS

FIELD

This disclosure is concerned with measuring concentrations of gaseous hydrocarbons in a mixture and may extend to some measurement of volatile hydrocarbons present as vapor in the mixture. A sample of gas to be measured may be taken directly from a gas mixture or may be collected from a liquid in which gaseous hydrocarbons are present or may possibly be present.

BACKGROUND

There are a number of circumstances in which there is a requirement to measure concentrations of constituent gases in a mixture of low molecular weight hydrocarbons, such as alkanes with 1 to 4 carbon atoms which are gases at normal temperature and pressure. Measurement of absorbance of mid-infrared (typically 2 $\mu$m to 20 $\mu$m wavelength) radiation is a known method for measuring gases. However, the infrared spectra of the gaseous C1 to C4 alkanes contain absorption peaks at similar wavelengths, which means that absorption at one wavelength may be attributable to several different hydrocarbons. A known, but complex, method is to make measurements at a large number of wavelengths with an infrared spectrometer, so that the number of measurements is much larger than the number of gases in the mixture and use a computational procedure to estimate the concentrations.

As to collecting a sample for analysis, there are some circumstances where a sample of gaseous hydrocarbons may simply be a sample taken from a larger quantity of a gas mixture. However, it may be desired to measure gaseous hydrocarbons which are present within a liquid. In particular, this may be in the context of "mud logging" which is measuring constituents of drilling fluid returning to the surface from a wellbore as it is being drilled. Requirements for mud logging can range from a fairly simple gas analysis (frequently for regulatory and safety reasons) to a more complete analysis of gases for formation evaluation.

One approach for collecting gases from a liquid is to provide apparatus in which an internal space enclosed within the apparatus is separated from liquid outside the apparatus by a gas-permeable membrane. Such a membrane allows gas to enter a chamber within the apparatus and the amount of gas can then be measured.

A number of technologies have been proposed for measuring gas which has entered such apparatus through a membrane. Society of Petroleum Engineers paper SPE62525 describes a device for measurement of gases brought to the surface by the circulation of drilling fluid as a borehole is drilled. Gaseous hydrocarbon from the fluid enters a probe through a semipermeable membrane and is carried away from the membrane by a flow of carrier gas. The hydrocarbon gas in the gas stream is then analyzed by separating it into individual gases with a gas chromatograph. See Brumboiu, A. O., Hawker, D. P., Norquay, D. A., and D. K. Wolcott. "Application of Semipermeable Membrane Technology in the Measurement of Hydrocarbon Gases in Drilling Fluids." Paper presented at the SPE/AAPG Western Regional Meeting, Long Beach, California, June 2000. Paper Number: SPE-62525-MS, doi: https://doi.org/10.2118/62525-MS.

U.S. Pat. No. 7,434,446 describes a gas-detection system in which gas enters through a semi-permeable membrane.

Detectors mentioned as possibilities for measuring the gas which has entered through the membrane are a gas chromatograph, a mass spectrometer, and an optical cell. U.S. Pat. No. 10,018,606 shows a device in which gas enters through a semipermeable membrane and is circulated through a measurement cell which may be a non-dispersive infrared (NDIR) detector used for detecting methane and which can also be used for detecting carbon-dioxide generated within the device as a reference gas. However, there is no provision for measuring other low molecular weight hydrocarbons nor for distinguishing methane from other hydrocarbons.

Patent application WO201408915 shows an immersible system for detecting the presence and concentration of methane in a liquid. A methane permeable but liquid (e.g. water) impermeable membrane allows methane to enter a chamber where it is detected by absorption of near infrared light emitted by a light-emitting diode and having a wavelength between 1.60 $\mu$m and 1.69 $\mu$m. Again there is no mention of distinguishing methane from other hydrocarbons.

SUMMARY

This summary is provided to introduce concepts that will be further elaborated and described below in the detailed description. This summary is not intended to identify key or essential features of the claimed subject matter, nor is it intended to be used as an aid in limiting the scope of the claimed subject matter.

Measurement of the concentration of an individual gas in a gas mixture can be made by measurement of the absorption of infrared radiation at a wavelength at which there is absorption by the gas of interest, but not by other gases in the mixture. However, as mentioned above, the absorption spectra of some alkanes containing 1 to 4 carbon atoms overlap. There is also overlap with the spectra of ethylene and propylene. Indeed, we have now found that the absorption spectra of several of these small alkanes do not provide any absorption wavelength in the mid-infrared range where there is no absorption by any other small alkane. The method of the present disclosure provides an approach for overcoming this problem.

One aspect of the present disclosure provides a method for measuring the concentrations of a plurality of gaseous/volatile hydrocarbons present in a gas mixture, the method comprising: for one or more individual hydrocarbons, which constitute a subset of the gas mixture, sending infrared radiation from an infrared source through a sample of the gas mixture to an infrared detector and operating the infrared detector to measure absorbance of infrared radiation at a predetermined wavelength chosen to be associated with the individual hydrocarbon and at which the individual hydrocarbon has an absorption coefficient which is at least 5 times, preferably 8 or 10 times, greater than the absorption coefficient of any other gas in the mixture at the same wavelength; for at least one other hydrocarbon or group of hydrocarbons which are part of the gas mixture but outside the said subset, sending infrared radiation from an infrared source through the sample of the gas mixture to an infrared detector and operating the detector to measure absorbance of infrared radiation at a predetermined wavelength chosen to be associated with the said other hydrocarbon or group of hydrocarbons and at which the said other hydrocarbon or group of hydrocarbons outside the subset and also at least one hydrocarbon within the subset absorb infrared radiation; and operating a computer processor to receive the measurements of absorbance of infrared radiation, calculate the concentrations of each hydrocarbon within the subset from the measured absorbances at the predetermined wavelengths associated with the individual hydrocarbons within the subset, calculate a predicted absorbance by each hydrocarbon within the subset at the wavelength associated with the said other hydrocarbon or group of hydrocarbons outside the subset, subtract the predicted absorbances from the measured absorbance at the said wavelength associated with the said other hydrocarbon or group of hydrocarbons outside the subset and thereby calculate absorbance by said other hydrocarbon or group of hydrocarbons outside the subset, and use the calculated absorbance by said other hydrocarbon or group of hydrocarbons outside the subset to calculate the concentration of the said other hydrocarbon or group of hydrocarbons in the sample.

The above-mentioned subset of the gas mixture may consist of a single hydrocarbon or a plurality of hydrocarbons. These may be hydrocarbons of 1 to 4 carbon atoms. For example, a subset could be one alkane, such as propane or could be a mixture of alkanes containing two or more carbon atoms. There may be a single hydrocarbon or group of hydrocarbons outside the subset.

The method may be extended to a second hydrocarbon or second group of hydrocarbons where there is a need to distinguish from a hydrocarbon outside the said subset, with such a form of the method comprising: measuring absorption of infrared radiation at a predetermined wavelength chosen to be associated with the said second hydrocarbon or second group of hydrocarbons and at which the first and second hydrocarbons or groups of hydrocarbons outside the subset and at least one hydrocarbon within the subset all absorb infrared radiation; and operating the computer processor to: calculate a predicted absorption by each hydrocarbon within the subset at the wavelength associated with the second hydrocarbon or group of hydrocarbons outside the subset, calculate a predicted absorption by the first hydrocarbon or group of hydrocarbons outside the subset at each wavelength associated with the second hydrocarbon or group of hydrocarbons outside the subset, and subtract the predicted absorptions from the measured absorption at the wavelength associated with the second hydrocarbon or group of hydrocarbons outside the subset and thereby calculate absorption by the second hydrocarbon or group of hydrocarbons outside the subset and use the calculated absorption by said second hydrocarbon or group of hydrocarbons outside the subset to calculate the concentration of the said second hydrocarbon or group of hydrocarbons in the sample.

Another aspect of this disclosure is an apparatus for measuring absorption of infrared radiation by a gas sample combined with a computer system which is connectable to the apparatus to receive measurements of absorption from the apparatus and which has a program stored in computer memory to receive the measurements of absorption and process them in accordance with the above method. The apparatus may include a gas permeable membrane at an entrance to an interior chamber, so that the apparatus can be immersed in a liquid to collect a gas sample from the liquid.

Possible applications of forms of the present disclosure which include separating a sample gas mixture from liquid include checking water in the vicinity of a buried pipeline for any leakage of gas from the pipeline, measurement of the concentrations of hydrocarbon gases dissolved in crude oil (e.g., using apparatus on a subsurface tool or installation) mud-logging, i.e. measuring one or more gases in drilling fluid returning to the surface from a wellbore, quantitative measurement of gases including hydrocarbons leaking from cap rocks, or leaking from abandoned oil wells, quantitative measurement of gases generated by landfills and other waste sites, quantitative measurement of biogas generation by agricultural waste, monitoring the gases generated in lakes and monitoring dissolved gases in transformer oils.

BRIEF DESCRIPTION OF DRAWINGS

The subject disclosure is further described in the detailed description which follows, in reference to the noted plurality of drawings by way of non-limiting examples of the subject disclosure, in which like reference numerals represent similar parts throughout the several views of the drawings, and wherein:

FIG. 1 shows absorption spectra of ethylene and propylene over a small range of wavelengths;

FIG. 2 is a schematic cross section of an example of apparatus for measuring concentrations of gases in a mixture;

FIG. 3 is a detail view of an array of narrow bandpass filters on the line F-F of FIG. 2 or FIG. 4 or FIG. 7;

DETAILED DESCRIPTION

Figures 4, 5, 6:
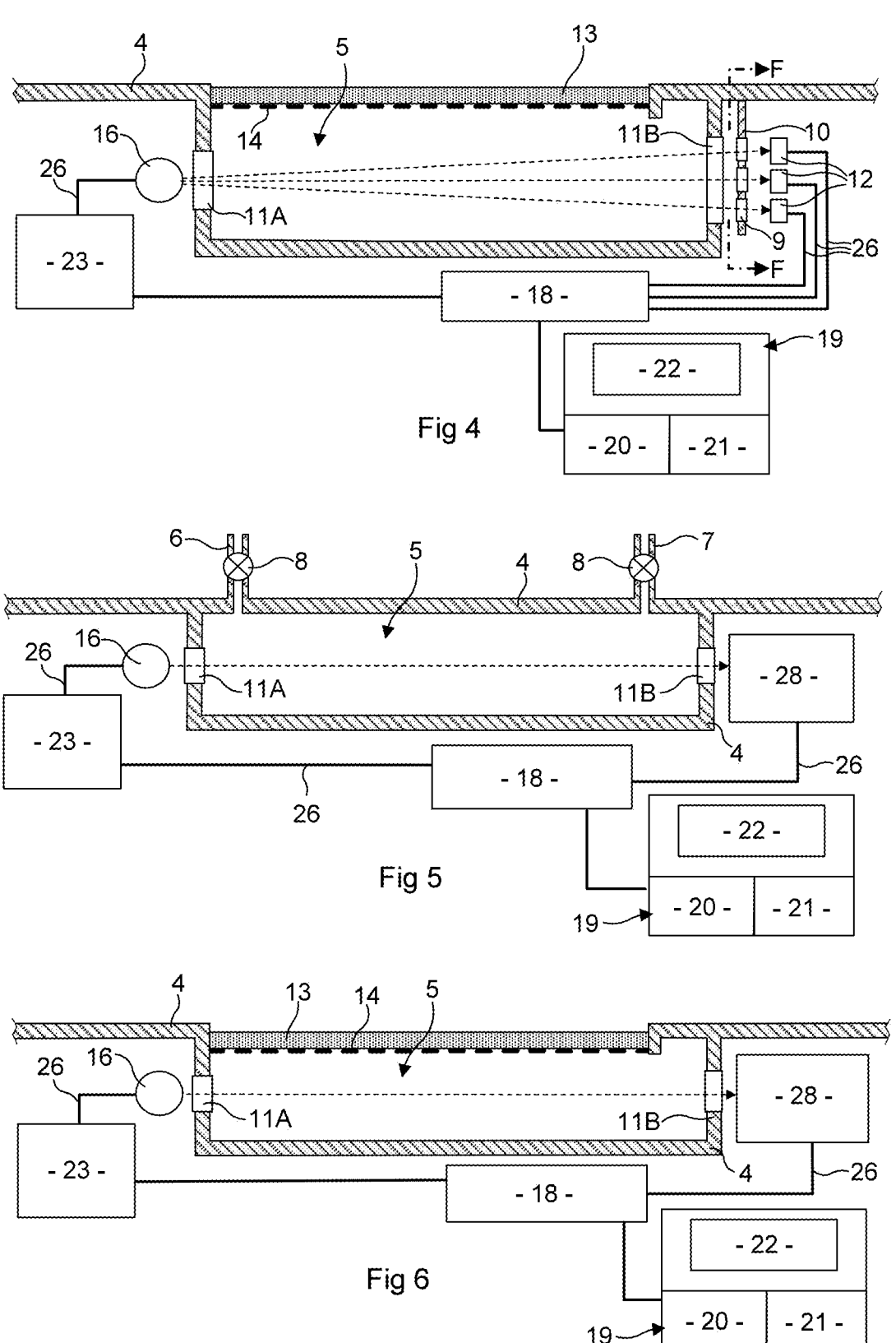
FIG. 4 is a schematic cross section of an example of apparatus similar to FIG. 2 but intended for immersion to collect a sample of gas mixture from the liquid in which it is immersed.
FIG. 5 is a schematic cross section of apparatus similar to that of FIG. 2 but using a spectrometer instead of narrow bandpass filters.
FIG. 6 is a schematic cross section of apparatus similar to that of FIG. 4 but using a spectrometer instead of narrow bandpass filters.

The particulars shown herein are by way of example and for purposes of illustrative discussion of the embodiments of the subject disclosure only and are presented in the cause of providing what is believed to be the most useful and readily understood description of the principles and conceptual aspects of the subject disclosure. In this regard, no attempt is made to show structural details in more detail than is necessary for the fundamental understanding of the subject disclosure, the description taken with the drawings making apparent to those skilled in the art how the several forms of the subject disclosure may be embodied in practice. Furthermore, like reference numbers and designations in the various drawings indicate like elements.

Many gas molecules have characteristic absorption peaks in the mid infrared region (wavelength 2-20 μm) of their absorption spectra. Gas concentrations can be determined by measuring absorption in this range and can be made specific to individual gases by measuring absorption at specific wavelengths. Measurement can be made at a specific wavelength by using a monochromatic laser as the infrared radiation source (if a monochromatic laser operating at the required wavelength is available) or by using a broad band infrared radiation source and passing the infrared radiation through a narrow bandpass filter which allows passage of infrared radiation absorbed by the gas, but blocks infrared radiation at wavelengths absorbed by other gases which may be present. Detectors used to measure intensity of infrared radiation in order to determine absorption may be non-dispersive infrared (NDIR) detectors where non-dispersive means that the radiation is not dispersed by a prism or diffraction grating to separate the radiation into different wavelengths. The infrared detector of an NDIR detector may be a photodiode. Other possibilities for use as a detector are a bolometer, a thermopile or a pyroelectric detector. These various detectors are electrical devices which are connected into electrical circuitry to provide measurements of the intensity of infrared radiation falling on them.

A further possibility to is to receive the infrared radiation which has passed through a gas by using a dispersive device, such as a spectrometer, to measure intensity at the or each required wavelength.

Measurement of infrared radiation intensity at a wavelength where an analyte gas absorbs, but other gases present do not absorb, enables determination of absorbance by that analyte gas. Concentration of the analyte gas can then be determined from the absorbance.

The absorbance (A) measured by an infrared detector is defined by:

$$A = -\ln\left(\frac{I}{I_o}\right) \qquad (1)$$

where $I_o$ and $I$ are the intensities of the radiation reaching the infrared detector in the absence and presence of absorbing species. The values of $I$ and $I_o$ are conventionally measured at the same wavelength and using the same apparatus so that changes within the apparatus such as changes in the intensity of the infrared source do not affect the determination of absorbance.

According to the Beer-Lambert law, the absorbance (A) at a given wavelength ($\lambda$) is directly proportional to the concentrations ($c_i$) of each species (i) absorbing at that wavelength ($\lambda$), the absorption coefficient ($\varepsilon_i$), which is also referred to as absorptivity and as molar absorption coefficient, of each species i and the optical path length (L). If there is only a single absorbing species (i) the formula for absorbance at wavelength ($\lambda$) is:

$$A = \varepsilon_{i\lambda} L c_i \qquad (2)$$

and so the concentration of an analyte gas can be determined from the absorbance at a wavelength where the analyte gas absorbs but other gases present do not absorb. If there is absorption by more than one species, the formula becomes a summation:

$$A = \sum_i \varepsilon_{i\lambda} L c_i \qquad (3)$$

When measuring absorption of infrared radiation by an analyte gas in an enclosure, it may be inconvenient or impractical to remove all the analyte gas by flushing with other gas in order to measure $I_o$. An approach which avoids the need to flush all the analyte gas from the cell is to measure absorption at a reference wavelength ($\lambda_r$). where there is no absorption by the analyte gas. A modified absorbance $A_m$ can be defined by $$A_m = -\ln\left(\frac{I(\lambda)}{I(\lambda_r)}\right) \qquad (4)$$

where $I(\lambda)$ is the intensity at a chosen wavelength ($\lambda$) at which the analyte gas or gases absorb and $I(\lambda_r)$ is the intensity at a reference wavelength ($\lambda_r$). This reference wavelength may be a wavelength at which there is absorption by a reference gas deliberately added to the gas mixture and maintained at a constant concentration but there is no significant absorption by any of the components being analyzed. Another possibility, which avoids the need to maintain a reference gas at a constant concentration and so may be more convenient, is to choose a wavelength at which there is no absorption by any gas present in the mixture, and use that wavelength as reference by using measured intensity at that wavelength as the reference intensity $I(\lambda_r)$. It is assumed that there is a constant relationship between $I_o(\lambda)$ and $I(\lambda_r)$. of the form $I(\lambda_r)=kI_o(\lambda)$, where k is a constant (k>0), and therefore $$A_m = -\ln\left(\frac{I(\lambda)}{kI_o(\lambda)}\right) = A + \ln(k) \qquad (5)$$

The infrared absorption spectra of gases may show an absorption peak at which one gas in a mixture absorbs while other gases in the mixture do not, but may also show wavelengths at which more than one gas in a mixture will absorb. This is illustrated by FIG. 1 which shows absorption spectra of ethylene and propylene over a small range from about 5.1 μm to 5.7 μm. The wavelength scale is shown in FIG. 1 as wavenumber which is the reciprocal of wavelength. As shown, at about 1850 cm$^{-1}$ (5.40 μm) both of these gases have similar absorbance, but between about 1910 cm$^{-1}$ and 1930 cm$^{-1}$ (5.18 to 5.23 μm) ethylene absorbs much more strongly than propylene whereas between about 1800 cm$^{-1}$ and 1830 cm$^{-1}$ (5.56 to 5.46 μm) propylene absorbs strongly while ethylene has low absorbance. Consequently, it is possible to use measurements of absorbance within these ranges to measure the concentrations of ethylene and propylene in the presence of each other. A possible reference wavelength is 1760 cm$^{-1}$ (5.68 μm) at which both of these gases have low absorption.

We have found that the low molecular weight alkanes with up to four carbon atoms, which are gases at normal temperature and pressure, have mid-infrared absorption spectra with overlapping peaks such that several of these gases do not have any distinguishing absorption wavelength at which no other low molecular weight alkanes absorb. This is an obstacle to use of mid-infrared to measure concentrations, but a procedure in accordance with this disclosure will enable determination of concentrations of these low molecular weight alkanes in a mixture.

FIGS. 2 to 8 show forms of apparatus which may be used for measuring absorbance of infrared radiation. If a gas mixture to be measured is available in gaseous form, measurement may be made using apparatus akin to a conventional gas cell used for infrared spectroscopy. This is illustrated by FIG. 2 which is a diagrammatic cross sectional view through an embodiment of apparatus for receiving a sample in gas form and measuring absorption at various wavelengths. Structural walls 4 of the apparatus enclose an interior chamber 5. An inlet 6 and outlet 7 allow a gas mixture to be pumped into the chamber 5. This flow of gas through the chamber 5 displaces any gas previously in the chamber 5 and then the valves 8 are closed, trapping a sample of the gas mixture in the chamber 5.

The structural walls 4 incorporate windows 11A, 11B which allow passage of infrared radiation. Various materials which are able to transmit infrared radiation may be used for these windows. Possibilities include zinc selenide, silicon, germanium, sapphire, cubic zirconia and diamond. In order to measure absorbance at various wavelengths by the gas sample in the chamber 5, a broadband infrared radiation source 16 is positioned adjacent to the window 11A at one end of the interior chamber 5. In this embodiment of apparatus, the infrared radiation source 16 is a broadband source, such as an incandescent lamp or some other heated body. Silicon carbide heating elements e.g. Globar can maintain a constant temperature and have a good working life.

The source 16 sends infrared radiation through the window 11A to pass through the chamber 5 and then through the window 11B to an array of narrow bandpass filters 9 mounted on a fixed support 10. The positions of the filters 9 in an array on the support 10 is shown by FIG. 3. There are positions for nine filters on the support 10 but it may not be necessary to use all nine and in FIG. 3 two positions where no filter is fitted are shown with broken lines. Each filter 9 passes radiation within a narrow bandwidth extending to either side of a peak wavelength at which transmission is maximum. Each filter 9 may be such that there is no more than 50% of the maximum transmission at 250 nanometres either side of the peak wavelength. One supplier of narrow bandpass filters is Andover Corporation, Salem, New Hampshire.

The filtered infrared radiation is received by an array of infrared detectors 12, where each detector receives radiation from one filter 9. The infrared detectors may be photodiodes or thermopiles and each one is connected to electrical circuitry located within an electronics package 18. The electrical circuits of package 18 use the detectors 12 to measure the intensity of infrared radiation reaching each detector. The electronics package 18 also converts the measurements from analogue to digital and is connectable to a computer 19 which incorporates a processor 20, memory 21 and a human/machine interface 22 which may be a graphic display and a keyboard or may be a touch screen. This electronics package is also connected to a power supply 23 for the source 16. The electrical connections are indicated 26.

FIG. 4 is a cross sectional view through an embodiment of apparatus which may be immersed in a liquid to collect a sample of any gases present in the liquid and then used to measure infrared absorbance of the sample. As in FIG. 2, structural walls 4 of the apparatus enclose an interior chamber 5. In this form of apparatus, the interior chamber 5 has an inlet opening at which a gas permeable membrane 13 is supported by a mesh 14. This membrane 13 prevents liquid from entering the interior chamber 5 but allows gas dissolved in the liquid to come out of solution and diffuse through the membrane into the interior chamber 5. The membrane 13 may be a composite membrane formed of a semi permeable material applied to support layers of a porous/highly permeable substrate. In other respects, this apparatus has the same features as the apparatus of FIG. 2 and these are indicated with the same reference numerals.

A possible composition of a membrane which is permeable to gaseous hydrocarbons (and is also permeable to carbon dioxide) is a gas selective layer of polydimethylsiloxane (PDMS) over a microporous layer of polyvinylidene fluoride (PVDF) on a non-woven support layer of polyphenylene sulphide (PPS). A supplier of gas-permeable membranes is Membrane Technology and Research Inc, Newark, California.

FIGS. 5 and 6 show apparatus which is similar to that of FIGS. 3 and 5, except that the array of narrow bandpass filters 9 and the detectors 12 are not used. After infrared radiation passes through window 11B it is received by a spectrometer which measures received infrared radiation at every wavelength within a range. The measured intensities are communicated from the spectrometer to the electronics package 18, or alternatively communicated directly to the computer 19.

The forms of apparatus shown so far have shown optical paths which extend from the source 16 to a detector 12 or spectrometer 30. Absorption of infrared by gases in the sample takes place in the portion of an optical path which is between window 11A and window 11B and so is within the chamber 5. In FIGS. 2 to 6 the path length between the windows is the same or approximately the same for all measurement wavelengths. However, it is possible to use more than one path length, as shown by the apparatus of FIG. 7.

In this apparatus the infrared source sends infrared radiation through windows 11A and 11B to narrow bandpass filters 9 and detectors 12, but also sends infrared radiation through a window 11C to a second array of narrow bandpass filters 49 with associated detectors 42. These detectors 42 are also connected to the electronics package 18. Provision of two different path lengths can enhance the measuring range of the apparatus if the shorter path length is used for gases which are more abundant in the gas mixture and the longer path length is used for the less abundant gases.

Figure 7:
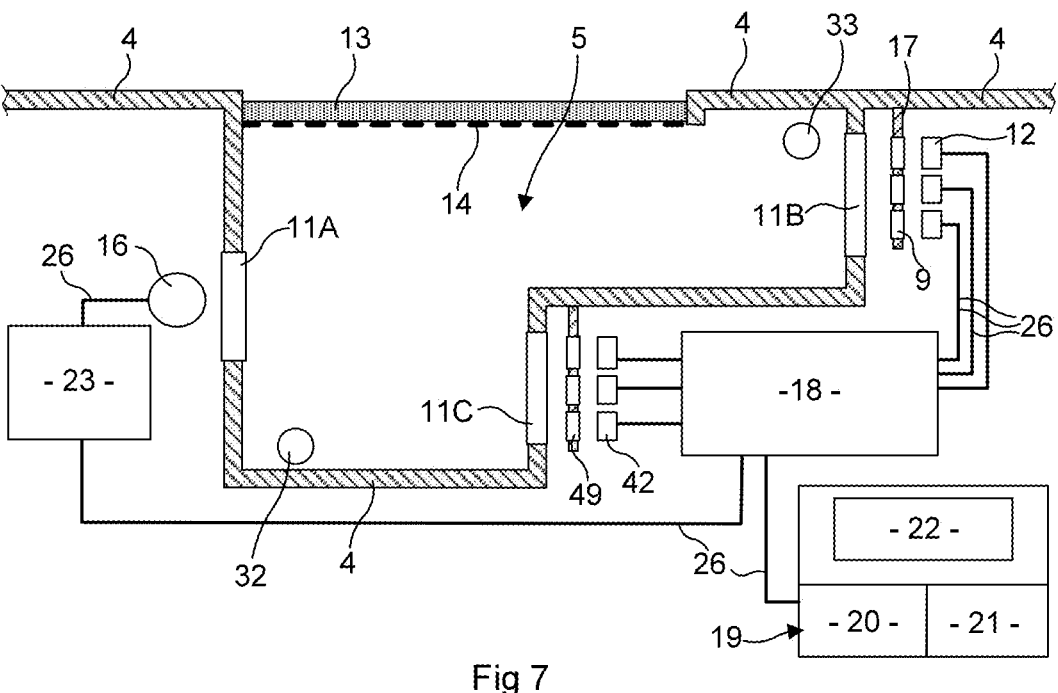
FIG. 7 is a schematic cross section on line A-A of FIG. 8 of apparatus with two optical path lengths.
Figure 8:
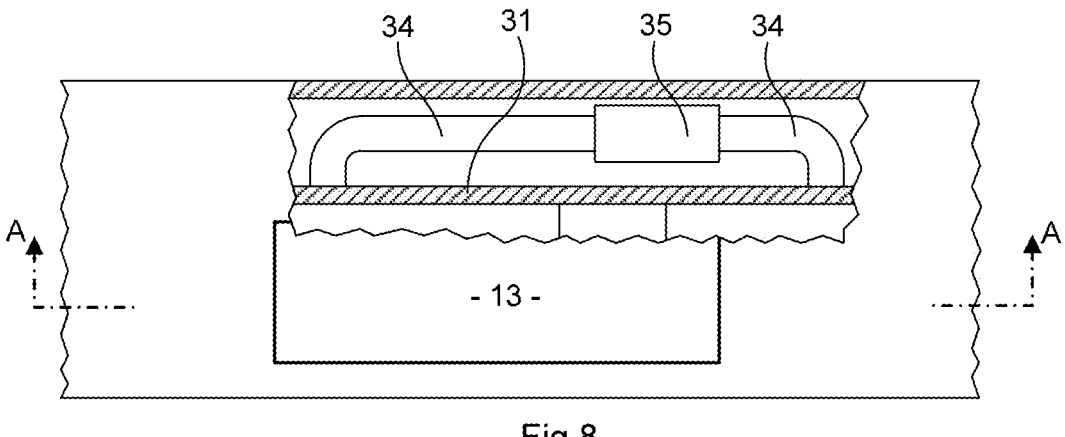
FIG. 8 is a top view onto the apparatus of FIG. 7, partly broken away.

FIGS. 7 and 8 show a possible addition to the apparatus as so far described. Part of the structure enclosing the interior chamber 5 is an internal wall 31. Holes 32, 33 through this wall are connected by tubing 34 to an enclosure 35 containing a fan which draws gas mixture from the interior chamber through hole 33 and circulates it back into the interior chamber through hole 32, thus providing mixing and a uniform composition of the gas mixture within the interior chamber.

The measuring and calculation procedure of this disclosure will now be described through two examples, the first of which refers to a mixture of alkanes and the second of which refers to a mixture which contains the olefins, ethylene and propylene as well as alkanes.

Example 1

For the purpose of explanation, this example refers to measurement of the constituent gases in natural gas from an underground formation. The gases expected to be present are methane ($CH_4$), ethane ($C_2H_6$), propane ($C_3H_8$), n-butane (n-$C_4H_{10}$) and iso-butane (iso-$C_4H_{10}$). The spectrum of propane and the spectrum of n-butane include wavelengths at which they absorb infrared radiation but the other alkanes do not. These two gases therefore come within the above-mentioned subset which is hydrocarbon gases having a wavelength at which the individual hydrocarbon has an absorption coefficient which is at least 10 times greater than absorption coefficient at the same wavelength of any other gas in the mixture. Methane, ethane and iso-butane do not have any absorption wavelength at which no other gas in the mixture has significant absorbance. The following table lists each of the gases together with a wavelength useful for measurement and the other gases which absorb at the same wavelength (referred to as interfering gases). Whether the absorption by these interfering gases was small or large is also indicated.

| Gas | Measurement wavelength (μm) | Interfering gases |
|---|---|---|
| methane | 8.051 | ethane (small), propane (small), n-butane (small), iso-butane (small) |
| ethane | 11.943 | propane (small) |
| propane | 9.437 | none |
| n-butane | 10.132 | none |
| i-butane | 8.513 | propane (small) |

Figure 9:
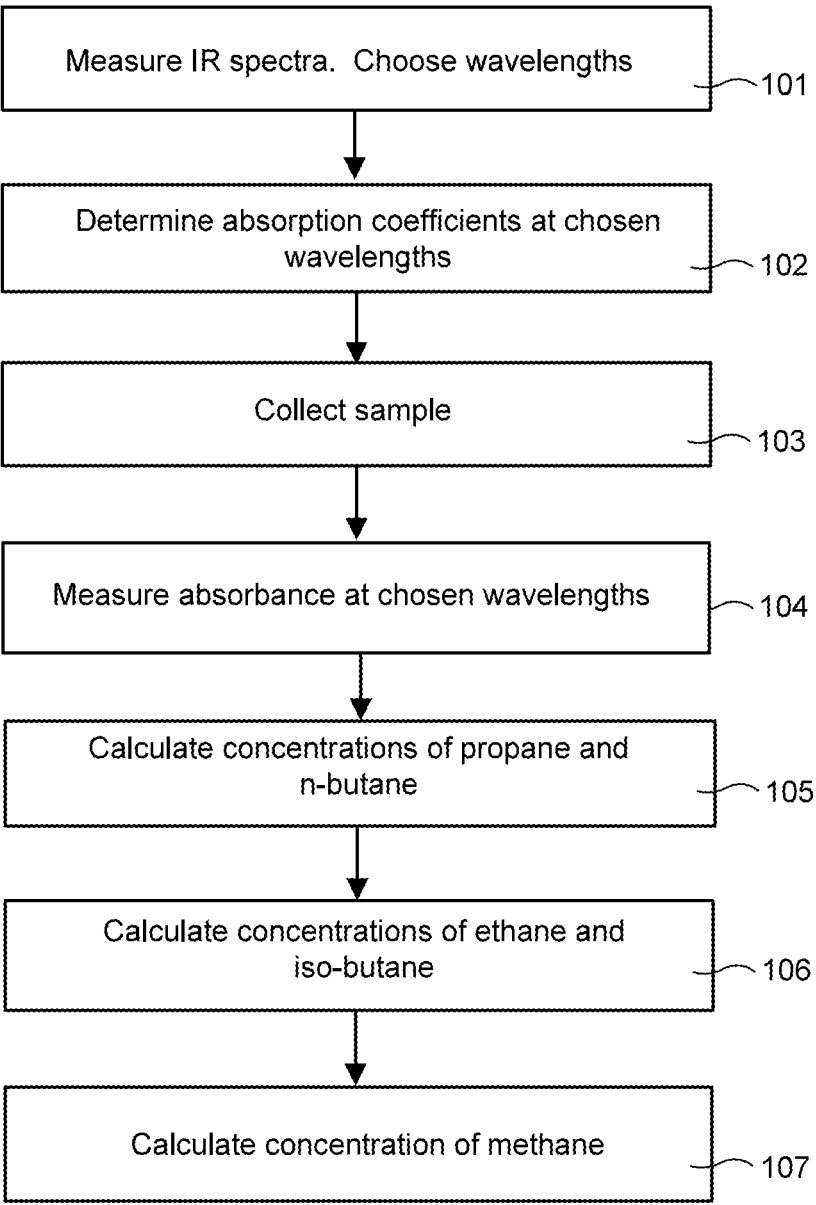
FIG. 9 is a flowchart of a method in accordance with this disclosure.

FIG. 9 is a flowchart showing steps of a procedure using the apparatus of any of FIGS. 2 to 8 to measure the concentrations of C1 to C4 alkanes in a gas mixture. The first two steps 101 and 102 shown in FIG. 9 are preparatory and might be completed as a one-time-only task by a manufacturer of the apparatus. The first step 101, which has already been completed for this example, is to choose the wavelengths at which measurements will be made, from examination of spectra. Each spectrum may be measured using a sample of the pure gas in a conventional gas cell fitted to a laboratory infrared spectrometer.

The second step 102, which is also preparatory, is to determine the absorption coefficient ($\varepsilon_i$) of each of the expected gases at every one of the chosen wavelengths. This may be completed using a sample of the pure gas at a known concentration in nitrogen as diluent. The absorbance is measured in a conventional gas cell with known optical path length within the cell, so that the absorption coefficient is the only unknown term in equation (2):

$$A = \varepsilon_{i\lambda} L c_i \qquad (2)$$

and so the absorption coefficient can be calculated.

The subsequent steps of the procedure use apparatus as shown in FIG. 2, 4 or 7, with the bandpass filters 9 or 49 chosen to pass infrared radiation of the required wavelengths. Alternatively, these steps can be carried out with the apparatus of FIG. 5 or FIG. 6 using the spectrometer to measure absorbance at the chosen wavelengths. Step 103 is to collect a sample of gas in the interior chamber of the apparatus. With apparatus as shown in FIG. 4, FIG. 6 or FIG. 7, this is completed by immersing the apparatus in a liquid containing the gases to be tested and waiting for a period of time allowing gases to diffuse through the membrane 12 into the internal chamber 15 until gas composition in the chamber 15 reaches equilibrium.

Step 104 is to measure absorption of infrared by the gas mixture which has diffused into the interior space 15, using the array of filters 9 and infrared detectors 12 or alternatively the spectrometer 30 to measure absorbance at every wavelength chosen in step 101.

Steps 105 onwards are calculations using the absorption coefficients determined in preparatory step 102 and the absorbances measured at step 104. Step 105 is to calculate the concentrations of propane and n-butane from the measured absorbances using the length of the optical path across the chamber 5 between the windows 11A and 11B or between 11A and 11C, and also using the absorption coefficients for these gases determined in the preparatory step 102. The equations given by the Beer-Lambert law are:

$$A_p = C_p \varepsilon_{p(p)} L_p \quad \text{and} \quad A_{nbu} = C_{nbu} \varepsilon_{nbu(nbu)} L_{nbu}$$

where:

$A_p$ is the measured absorbance at the wavelength chosen for propane in step 101 and $\varepsilon_{p(p)}$ is the absorption coefficient of propane at this wavelength, $A_{nbu}$ is the measured absorbance at the wavelength chosen for n-butane in step 101 and $\varepsilon_{nbu(nbu)}$ is the absorption coefficient of n-butane at this chosen wavelength, $C_p$ and $C_{nbu}$ are the concentrations of propane and n-butane within the chamber 5, and $L_p$ and $L_{nbu}$ are the lengths between windows of the chamber 5 in optical paths leading towards the detectors for infrared radiation at the wavelengths chosen for propane and n-butane in step 101.

Step 106 of the procedure is to calculate the concentrations of ethane and iso-butane. These calculations use the concentration of propane calculated in the previous step 105. For ethane the equation given by the Beer-Lambert law is $$A_e = C_e \varepsilon_{e(e)} L_e + C_p \varepsilon_{p(e)} L_e$$

where:

$A_e$ is the measured absorbance at the wavelength chosen for ethane in step 101, $\varepsilon_{p(e)}$ is the absorption coefficient of propane at this wavelength, $C_e$ is the concentration of ethane within the chamber 5 and $L_e$ is the path length between windows of the chamber 5, along an optical path leading to the detector of infrared radiation at the wavelength chosen for ethane in step 101.

The concentration of ethane $C_e$ is the only unknown term in the equation and so can be calculated. Calculation of the concentration of iso-butane is exactly similar to the calculation for ethane.

The final step 107 of the procedure is to calculate the concentration of methane using the concentrations of the interfering gases ethane, propane, n-butane and iso-butane previously calculated. The equation given by the Beer-Lambert law is:

$$A_m = C_m \varepsilon_{m(m)} L_m + C_e \varepsilon_{e(m)} L_m + C_p \varepsilon_{p(m)} L_m + C_{nbu} \varepsilon_{nbu(m)} L_m + C_{ibu} \varepsilon_{ibu(m)} L_m$$

where:

$A_m$ is the measured absorbance at the wavelength chosen for methane in step 101, $\varepsilon_{m(m)}$, $\varepsilon_{e(m)}$, $\varepsilon_{p(m)}$, $\varepsilon_{nbu(m)}$ and $\varepsilon_{ibu(m)}$ are the absorption coefficients of methane, ethane, propane, n-butane and iso-butane at this chosen wavelength, $C_m$, $C_e$, $C_p$, $C_{nbu}$ and $C_{ibu}$ are the concentrations of methane, ethane, propane, n-butane and iso-butane within the chamber 5, and $L_m$ is the optical path length between the windows of the chamber 5 along a path leading to the detector used for infrared radiation at the wavelength chosen for methane in step 101. The concentration of methane $C_m$ is the only unknown and so it can be calculated.

Steps 104 onwards may be carried out automatically by the computer 19 which is programmed to control the electronics package 18 to make the measurements with the narrow bandpass filters 9 (or 9 and 49 of FIG. 7) and detectors 12 (or 12 and 42 of FIG. 7) or to receive measurements from the spectrometer 30 and also to carry out the calculations at steps 104 to 107.

Example 2

This example refers to a "mud logging" measurement of the hydrocarbon gases present in drilling fluid returning to the surface from a wellbore which is being drilled. The hydrocarbon gases expected to be present are again the alkanes methane, ethane, propane, n-butane and iso-butane and also the olefins ethylene and propylene which may be formed at the rotating drill bit.

Figure 10:
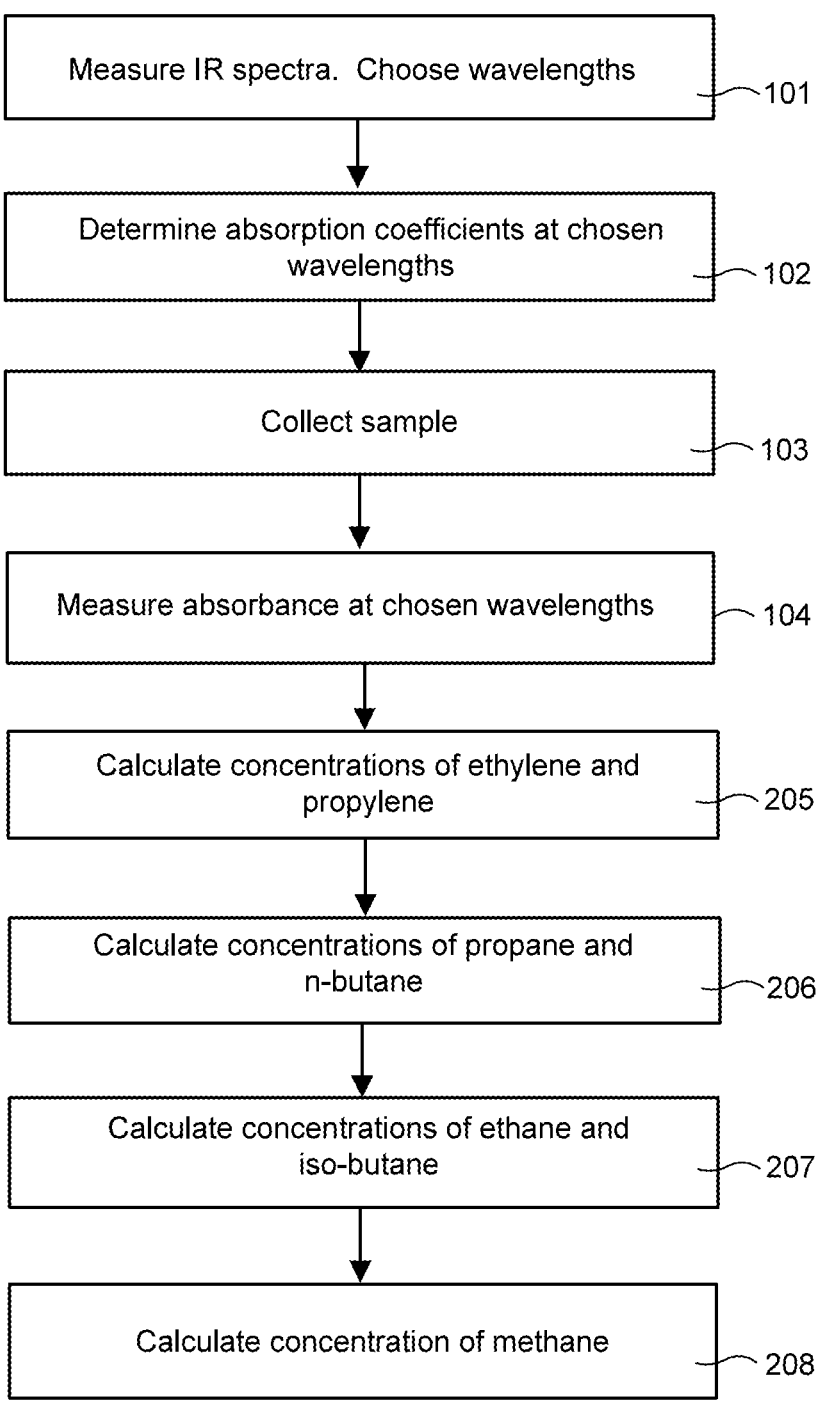
FIG. 10 is a flowchart of another method in accordance with this disclosure.

One or both of these olefins absorb at the wavelengths used to measure the alkanes. The procedure to be followed in accordance with this disclosure contains additional steps as shown in the flowchart which is FIG. 10. The following table lists each of the gases together with a wavelength useful for measurement and the other gases which absorb at the same wavelength (referred to as interfering gases). Whether the absorption by these interfering gases is small or large is also indicated.

| Gas | Measurement wavelength (μm) | Interfering gases |
|---|---|---|
| methane | 8.051 | ethane (small), propane (small), n-butane (small), iso-butane (small) |
| ethane | 11.943 | ethylene (large), propylene (large) propane (small) |
| propane | 9.437 | ethylene (large) propylene (large) |
| n-butane | 10.132 | ethylene (large) propylene (large) |
| i-butane | 8.513 | propane (small) propylene (small) |
| ethylene | 5.206 | none |
| propylene | 5.534 | none |

Ethylene and propylene form the above-mentioned subset which is hydrocarbon gases having a wavelength at which the individual hydrocarbon has an absorption which is at least 10 times greater than absorption at the same wavelength by any other gas in the mixture. None of the alkanes comes within this subset.

As with the previous example, the preparatory first step 101, which has already been completed for this example, is to choose the wavelengths at which the absorbance measurements will be made and the preparatory second step 102 is to determine the absorption coefficient (Ei) of each of the expected gases at every one of the chosen wavelengths. Step 103 is collection of a sample in the chamber 5 of the apparatus and step 104 is to measure absorbance at all of the chosen wavelengths.

The subsequent steps 205 onwards are calculations with the measured absorbances. Step 205 is to calculate the concentrations of ethylene and propylene from the measured absorbances at the chosen wavelengths of 5.206 μm and 5.534 μm using the length of the optical path across space 15 between the windows 11A and 11B, and the absorption coefficients for these gases determined in the preparatory work. The equations given by the Beer-Lambert law are $$A_{ey} = C_{ey}\varepsilon_{ey(ey)}L_{ey} \quad \text{and} \quad A_{py} = C_{py}\varepsilon_{py(py)}L_{py}$$

where:

$A_{ey}$ and $A_{py}$ are the measured absorbances at 5.206 μm and 5.534 μm, $C_{ey}$ and $C_{py}$ are the concentrations of ethylene and propylene within the chamber 5 of the apparatus, $\varepsilon_{ey(ey)}$ is the absorption coefficient of ethylene at 5.206 μm, $\varepsilon_{py(py)}$ is the absorption coefficient of propylene at 5.534 μm, and $L_{ey}$ and $L_{py}$ are the lengths between windows of the chamber 5 within optical paths leading towards the detectors for infrared radiation at the wavelengths chosen for ethylene and propylene in step 101.

Step 206 of the procedure is to calculate the concentrations of propane and n-butane, in a calculation using the concentrations of ethylene and propylene (members of the above-mentioned subset) calculated in step 205. For propane the equation given by the Beer-Lambert law is $$A_p = C_p\varepsilon_{p(p)}L_p + C_{ey}\varepsilon_{ey(p)}L_p + C_{py}\varepsilon_{py(p)}L_p$$

where:

$A_p$ is the absorbance measured at the wavelength chosen for propane in step 101.

$\varepsilon_{ey(p)}$ is the absorption coefficient of ethylene at this wavelength, $\varepsilon_{py(p)}$ is the absorption coefficient of propylene at this wavelength, $C_p$ is the concentration of propane within the space 15 and $L_p$ is length between windows of the chamber 5 of the optical path leading towards the detector of infrared radiation at the wavelength chosen for propane.

The concentration of propane $C_p$ is the only unknown term in the equation and so can be calculated. Calculation of the concentration of n-butane is exactly similar to the calculation for propane.

Step 207 of the procedure is to calculate the concentrations of iso-butane and ethane using concentrations of interfering gases calculated in previous steps. For iso-butane the only interfering gases were propane and propylene, so the equation given by the Beer-Lambert law is $$A_{ibu} = C_{ibu}\varepsilon_{ibu(ibu)}L_l + C_p\varepsilon_{p(ibu)}Ll + C_{py}\varepsilon_{py(ibu)}L_l$$

where:

$A_{ibu}$ is the measured absorbance at the wavelength chosen for iso-butane in step 101, $\varepsilon_{ibu(ibu)}$, $\varepsilon_{ey(ibu)}$ and $\varepsilon_{py(ibu)}$ are the absorption coefficients of iso-butane, propane and propylene at this wavelength, $C_{nbu}$ is the concentration of iso-butane within the chamber 5, and $L_1$ is the length between windows of the chamber 5 of the optical path leading towards the detector of infrared radiation at the wavelength chosen for propane.

For ethane the interfering gases are propane, ethylene and propylene and so the equation given by the Beer-Lambert law is $$A_e = C_e \varepsilon_{e(e)} L_e + C_p \varepsilon_{p(e)} L_e + C_{ey} \varepsilon_{ey(e)} L_e + C_{py} \varepsilon_{py(e)} L_e$$

where:

$A_e$ is the measured absorbance at the wavelength chosen for ethane in step 101, $\varepsilon_{e(e)}$, $\varepsilon_{p(e)}$ and $\varepsilon_{py(e)}$ are the absorption coefficients of ethane, propane, ethylene and propylene at this wavelength, $C_e$ is the concentration of ethane within the chamber 5, and $L_e$ is the path length between windows of the chamber 5 of the optical path leading towards the detector of infrared radiation at the wavelength chosen for ethane.

Step 208 of the procedure is to calculate the concentration of methane using the concentrations of other gases previously calculated. The equation given by the Beer-Lambert law is:

$$A_m = C_m \varepsilon_{m(m)} L_m + C_e \varepsilon_{e(m)} L_m + C_p \varepsilon_{p(m)} L_m + C_{nbu} \varepsilon_{nbu(m)} L_m + C_{ibu} \varepsilon_{ibu(m)} L_m$$

where:

$A_m$ is the measured absorbance at the wavelength chosen for methane in step 101, $\varepsilon_{m(m)}$, $\varepsilon_{e(m)}$ $\varepsilon_{p(m)}$, $\varepsilon_{nbu(m)}$ and $C_{nbu(m)}$ are the absorption coefficients of methane, ethane, propane, n-butane and iso-butane at this wavelength $C_m$, $C_e$, $C_p$, $C_{nbu}$ and $C_{ibu}$ are the concentrations of methane, ethane, propane, n-butane and iso-butane within the chamber 5, and $L_m$ is the path length between windows of the chamber 5 of the optical path leading towards the detector of infrared radiation at the wavelength chosen for methane.

The concentration of methane $C_m$ is the only unknown in the equation and so it can be calculated.

Steps 204 onwards may be carried out automatically by the computer 19 which is programmed to control the electronics package 18 to make the measurements with the narrow bandpass filters 9 (or 9 and 49 of FIG. 7) and detectors 12 (or 12 and 42 of FIG. 7) or with the spectrometer 30 and also to carry out the calculations at steps 204 to 208.

The procedures of the above Examples can be extended to make an estimation of volatile alkanes containing five or more carbon atoms, e.g. various isomers of pentane and hexane. Alkanes of two or more carbon atoms have an intense absorption at about 6.8 μm (1475 cm$^{-1}$). Measurement of the absorbance of this band may be made at 6.631 μm (1508 cm$^{-1}$) where absorbance coefficients for the various hydrocarbons are approximately equal and used to calculate a total concentration of alkanes of two or more carbon atoms. The concentrations of alkanes of two, three and four carbon atoms, calculated as above, are subtracted from this total concentration to give an estimate of the concentration of hydrocarbons of five or more carbon atoms.

Various embodiments of this disclosure have been set out above. These are intended to assist understanding of this disclosure, but not to limit it in any way. It should be appreciated that any features or possibilities described in combination may, where it is practical to do so, be used individually. Also, features or possibilities described in any embodiment may be used in any other embodiment, in so far as it is practical to do so. The features mentioned in the following claims may be combined in any possible way and where two or more claims are dependent on a preceding claim the reader should understand that the present disclosure includes any possible combination of any two or more or all of those dependent claims with each other and with the preceding claim from which they depend. Apparatus or a computer system may be used with any embodiment of the method of the present disclosure.

The invention claimed is:

1. A method of measuring concentrations of hydrocarbons in a gas mixture, comprising:

for one or more individual hydrocarbons, which constitute a subset of the gas mixture, sending infrared radiation from an infrared source through a sample of the gas mixture to an infrared detector and operating the infrared detector to measure absorbance of infrared radiation at a predetermined wavelength chosen to be associated with the individual hydrocarbon and at which the individual hydrocarbon has an absorption coefficient which is at least five times greater than the absorption coefficient of any other gas in the mixture at the same predetermined wavelength;

for at least one other hydrocarbon or group of hydrocarbons which are part of the gas mixture but outside the said subset, sending infrared radiation from an infrared source through the sample of the gas mixture to an infrared detector and operating the detector to measure absorbance of infrared radiation at a predetermined wavelength chosen to be associated with the said other hydrocarbon or group of hydrocarbons and at which the said other hydrocarbon or group of hydrocarbons outside the subset and also at least one hydrocarbon within the subset absorb infrared radiation;

operating a computer processor to receive the measurements of absorbance, calculate the concentrations of each hydrocarbon within the subset from the measured absorbances at the predetermined wavelengths associated with the individual hydrocarbons within the subset, calculate a predicted absorbance by each hydrocarbon within the subset at the wavelength associated with the said other hydrocarbon or group of hydrocarbons outside the subset, subtract the predicted absorbances from the measured absorbance at the said wavelength associated with the said other hydrocarbon or group of hydrocarbons outside the subset and thereby calculate absorbance by said other hydrocarbon or group of hydrocarbons outside the subset, and use the calculated absorbance by said other hydrocarbon or group of hydrocarbons outside the subset to calculate the concentration of the said other hydrocarbon or group of hydrocarbons in the sample.

2. The method of claim 1 wherein the gas mixture further comprises a second hydrocarbon or second group of hydrocarbons outside the subset, the method further comprises sending infrared radiation from an infrared source through the sample of the gas mixture to an infrared detector and operating the detector to measure absorbance of infrared radiation at a predetermined wavelength chosen to be associated with the said second hydrocarbon or second group of hydrocarbons outside the subset and at which both the first and second hydrocarbons or groups of hydrocarbons outside the subset absorb infrared radiation; and operating the computer processor to calculate a predicted absorbance by each hydrocarbon within the subset at the wavelength associated with the second hydrocarbon or group of hydrocarbons outside the subset, calculate a predicted absorbance by the first hydrocarbon or group of hydrocarbons outside the subset at the wavelength associated with the second hydrocarbon or group of hydrocarbons outside the subset, and subtract the predicted absorbances from the measured absorbance at the wavelength associated with the second hydrocarbon or group of hydrocarbons outside the subset and thereby calculate absorbance by the second hydrocarbon or group of hydrocarbons outside the subset, and use the calculated absorbance by said second hydrocarbon or group of hydrocarbons outside the subset to calculate the concentration of the said second hydrocarbon or group of hydrocarbons in the sample.

3. The method of claim 1, wherein sending infrared radiation from a source to a detector comprises passing the radiation through a narrow bandpass filter which passes the predetermined wavelength.

4. The method of claim 1, wherein each individual hydrocarbon within said subset of the gas mixture has an absorption coefficient at the predetermined wavelength chosen to be associated with the individual hydrocarbon which is at least 10 times greater than the absorption coefficient of any other gas in the mixture at the same predetermined wavelength.

5. The method of claim 1, wherein the individual hydrocarbons which constitute the subset are ethylene and propylene.

6. The method of claim 1, wherein the gas mixture does not contain more than 5 mole % of any olefin and the said subset consists of propane only.

7. The method of claim 1, wherein the hydrocarbon or group of hydrocarbons outside the subset consist of one or more hydrocarbons containing 1 to 4 carbon atoms.

8. The method of claim 1 wherein a group of hydrocarbons outside the subset comprises hydrocarbons of five or more carbon atoms.

9. A computer system comprising:

a processor; memory accessible by the processor; processor-executable instructions stored in the memory and executable to instruct the system to perform the steps of the method of claim 1.

10. One or more computer-readable storage media comprising processor-executable instructions to instruct a computing system to perform the steps of the method of claim 1 when executed by a processor of the computing system.

11. An apparatus for measuring concentrations of hydrocarbon gases in a gas mixture, the apparatus comprising:

a chamber within the apparatus to receive a sample of the gas mixture, at least one infrared radiation source to send infrared radiation into the chamber, at least one infrared radiation detector with connected electrical circuitry to receive and measure the intensity of infrared radiation from the at least one source, and a computer system according to claim 9 connected to the at least one detector and its connected electrical circuitry.

* * * * *